Jan. 20, 1959
K. E. SIHVONEN
2,869,372
BALANCING MACHINE
Filed Dec. 3, 1953
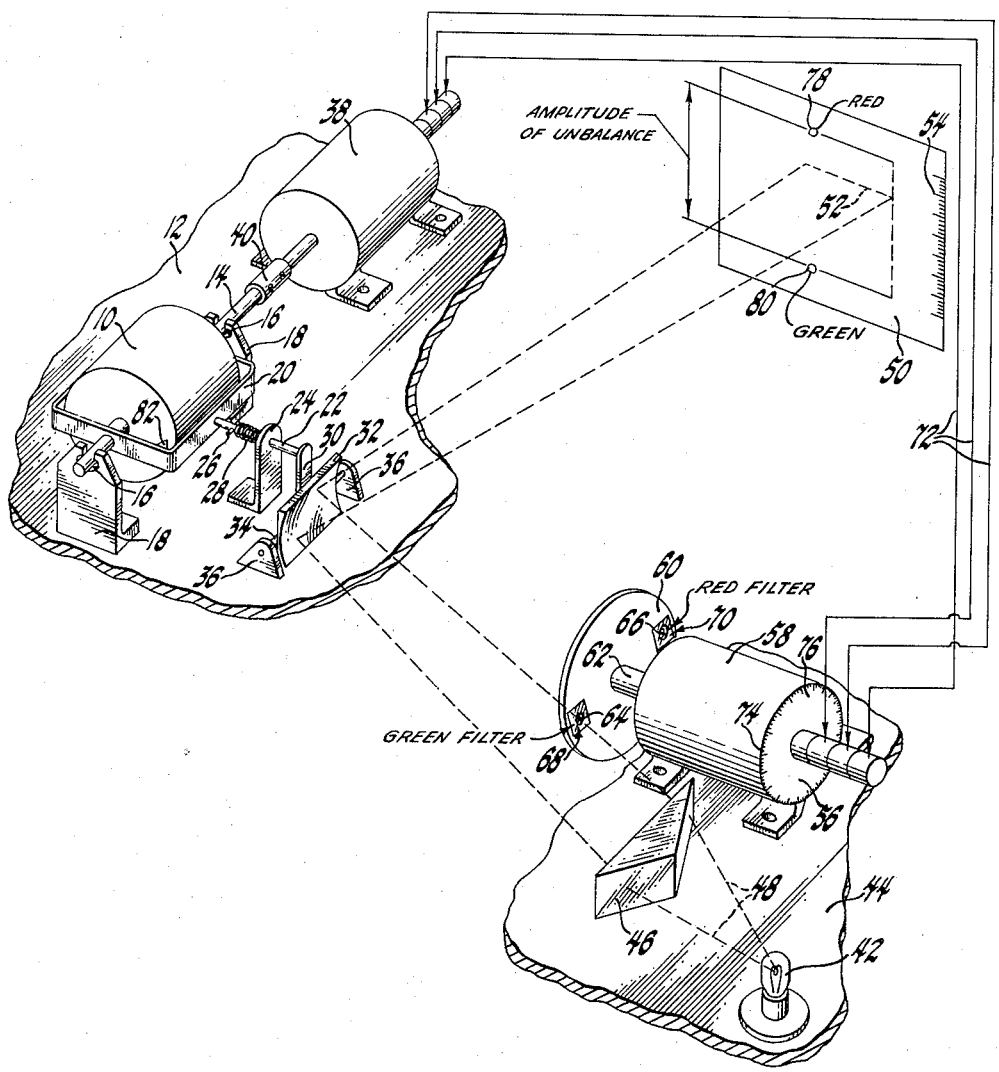
INVENTOR
Kauno E. Sihvonen
BY
L. D. Burch
ATTORNEY

United States Patent Office 2,869,372
Patented Jan. 20, 1959

2,869,372

BALANCING MACHINE

Kauno E. Sihvonen, Detroit, Mich., assignor to General Motors Corporation, Detroit, Mich., a corporation of Delaware Application December 3, 1953, Serial No. 396,044

3 Claims. (Cl. 73—460)

This invention relates to balancing machines in general and more particularly to balancing machines which are adapted to determine the magnitude and angular location of unbalance of a rotating member.

Members which are adapted to be rotated at high speeds, such as turbine wheels, motor armatures, engine flywheels and the like, must be carefully and accurately balanced. Any unbalance whatsoever which is present in such members is greatly magnified and of serious concern at high rotational speeds. Such unbalanced forces produce internal stresses within the rotating member, cause vibrational forces resulting in excessive wear to associated parts, and necessitate frequent and often expensive repairs. It is therefore desirable that a means of accurately determining the magnitude and angular location of such an unbalanced force be available. Further, it is desirable that such testing means be relatively simple to operate and repair, be sufficiently durable and compact to lend itself well to numerous uses, and be as inexpensive as possible to enable manufacturers to make extensive use of such a device in their shops as well as their laboratories. It is also important that such a device be capable of rapidly locating the unbalanced force to enable such a device to be used in mass production work.

This device makes use of light rays emanating from a stationary source and reflected from a tiltable reflector associated with the unbalanced member against a receiving screen. The rotational speed of the rotor during test may duplicate or exceed its operational speed to insure proper balance at such speeds. The magnitude of unbalance is shown on the screen as a function of the amplitude of the reflected light trace received thereon. Adjustable means which are synchronized with the rotation of the unbalanced member are adapted to intercept a portion of the light rays prior to their reaching the reflector and to pass a filter ray of light thereagainst only at the position of maximum tilt or deflection of such reflector. The calibration of such means provides an indication of the angular location of unbalance with respect to the rotary member by the adjustment required to effect such a condition.

In the drawing is shown an isometric view of an embodiment of the invention partially exploded and in schematic arrangement.

In practicing this invention an unbalanced rotary member 10 is mounted for rotation upon a stationary base 12. The ends of the shaft 14, with which the member 10 is adapted to rotate, are received within openings 16 formed in supports 18. The openings 16 are elongated to provide freedom of lateral movement for the unbalanced member 10 during rotation. A metal strap 20 extends around the unbalanced member 10 in spaced relation to the member, and is loosely engaged upon the ends of the shaft 14. A probe 22 is engaged with the strap 20 centrally between the supports 18. A bracket 24 is secured to the base 12 and is adapted to receive and support the probe 22. A pin 26 secured to the probe 22 and a spring 28 disposed about the probe between the pin and the bracket 24 provide a means of spring biasing the probe in engagement with strap 20. The outer end of the probe 22 is secured to an arm 30 which is secured to a concave reflector 32. The reflector 32 is pivotally mounted upon a shaft 34 journaled in supports 36. The supports 36 are secured to the base 12 in front of the bracket 24.

The unbalanced member 10 is driven by a drive motor 38 which is connected to the rotor shaft 14 by a flexible coupling 40. Operation of the motor 38 rotates the unbalanced member 10 and causes unbalanced forces to effect reciprocal movement of the probe 22. The probe 22 in turn causes the reflector 32 to be tilted forward and back about its pivotal axis.

A light source 42 is secured to a stationary base 44. An optic lens 46, preferably a prism, is secured to the base 44 in front of the light source 42 and between the light source and the reflector 32. The prism 46 is adapted to collect the light rays 48 emanating from the light source 42 and to direct parallel light rays towards the reflector 32. The base 44 may be entirely separate from the base 12 or may be contiguous therewith so long as the prism is adapted to direct the light rays 48 against the reflector 32.

A screen 50 is arranged to collect or receive the light rays 48 deflected off from the reflector 32. The screen 50 may be associated with the base 44 or disposed apart therefrom so long as it is adapted to receive the light rays from the reflector 32. The screen 50 is positioned at the focal length of the concave reflector 32 in order that the light rays 48 received from the reflector will produce a horizontal trace 52 upon the screen. As the reflector 32 is tilted forward and back about its axis 34 the horizontal trace 52 is caused to travel up and down on the screen 50. The linear distance that the trace 52 travels during each revolution of the unbalanced member 10 is a function of the magnitude of unbalance of the rotary member. The screen 50 may therefore be calibrated as at 54 to indicate such unbalance force.

An electric motor 56 is secured to the base 44 beside the light source 42 and lens 46. The motor 56 is housed within a casing 58 and adapted for rotation therein. A disk 60 is secured to the drive shaft 62 of the motor 56. The disk 60 is adapted to be rotated and to intercept a portion of the light rays 48 directed towards the reflector 32. Openings 64 and 66 are formed through the disk 60 on diametrically opposite sides thereof and near the outer periphery of the disk. A green filter 68 is secured over the one opening 64 and a red filter 70 is secured over the other opening 66. The motor 56 is electrically connected to the drive motor 38 for synchronous rotation by the electrical leads 72. For every revolution of the unbalanced member 10 the disk 60 also completes one revolution. A green filtered light ray as well as a red filtered light ray are thus caused to be deflected from the reflector 32 and against the screen 50 during each revolution of the unbalanced member 10 and to appear adjacent the white band formed by the line source 42 as reflected on screen 50, somewhere within the limits defined by the linear travel thereof on the screen.

The casing 58 is calibrated in angular degrees as at 74 and the motor 56 is provided with an indexing mark 76. By rotating the motor 56 within the casing 58 the disk 60 is progressed until the openings 64 and 66 are adapted to intercept the light rays 48 at the exact moment when the reflector 32 has been tilted the maximum amount. These maximum tilt positions are shown on the screen 50 at the extremes of the amplitude trace. Hence when the red spot of light 78 has been adjusted to appear at one extreme of the amplitude trace and the green spot of light 80 at the other extreme of the trace the angular location of the unbalanced force will be the same number of degrees from an initial position marked on the unbalanced member 10 as it has been necessary to advance the motor 56 within the casing 58. The initial position being that which has originally been marked upon the rotary member 10 opposite a pointer 82 formed on the strap 20 or any other similarly convenient means of indicating a reference point.

I claim:
1. Means for measuring the amount of unbalance in a rotating workpiece comprising, a pivotally mounted reflector, means for projecting a band of parallel light rays onto said reflector, a screen disposed remote from said reflector to receive said band, said reflector being operatively interconnected with said workpiece to move in response to vibrations in said workpiece to produce a light pattern on said screen having a size proportional to the magnitude of unbalance in said workpiece, a shutter disposed in front of said reflector for intercepting only a limited portion of said band so as to allow the remaining portion of said band to be continuously reflected onto said screen, said shutter being synchronously driven with said workpiece to permit a series of flashes of said intercepted portion of said band to pass therethrough and be reflected from said reflector and produce a bright spot on said screen immediately adjacent said pattern whenever said workpiece passes through some predetermined position, calibrated means for adjusting said predetermined position at which said shutter permits said flashes to occur.

2. The combination of claim 1 wherein said shutter comprises a wheel rotating about an axis parallel to said rays and having at least one aperture in the periphery for permitting said intercepted portion of said band to periodically pass therethrough.

3. Means for measuring the amount of unbalance in a rotating workpiece comprising, a pivotally mounted reflector, means for projecting a band of parallel light rays onto said reflector, a screen disposed remote from said reflector to receive said band, said reflector being operatively interconnected with said workpiece to move in response to vibrations in said workpiece to produce a light pattern on said screen having a size proportional to the magnitude of unbalance in said workpiece, a shutter wheel having the periphery thereof disposed in front of said reflector for intercepting only a limited portion of said band and allowing the remaining portions of said band to be continuously reflected onto said screen, said periphery having a first aperture with a filter of one color therein and a second aperture diametrically opposite thereto with a filter of another color therein, said shutter wheel being synchronously driven with said workpiece with said first aperture producing a first series of light flashes of said color and said second aperture producing a second series of light flashes of said second color, said flashes of light being directed onto said reflector and reflected onto said screen to produce a bright spot of said first color and a bright spot of said second color immediately adjacent said light pattern, calibrated means for adjusting the phase of said shutter wheel relative to said workpiece whereby said colored spots will move relative to said pattern.

References Cited in the file of this patent

UNITED STATES PATENTS

| | | |
|---|---|---|
| 1,740,762 | Biquard | Dec. 24, 1929 |
| 1,949,603 | Davey | Mar. 6, 1934 |
| 2,622,436 | Carr | Dec. 23, 1952 |

FOREIGN PATENTS

| | | |
|---|---|---|
| 574,978 | Germany | Apr. 21, 1933 |